United States Patent
Kokolis

Patent Number: 5,341,921
Date of Patent: Aug. 30, 1994

[54] CATENARY RIGID TOP TROUGHING ASSEMBLY

[75] Inventor: Edward N. Kokolis, 1502 Woodland Rd., Indiana, Pa. 15701

[73] Assignee: Edward N. Kokolis, Indiana, Pa.

[21] Appl. No.: 103,092

[22] Filed: Aug. 6, 1993

Related U.S. Application Data

[63] Continuation-in-part of Ser. No. 944,273, Sep. 14, 1992, abandoned.

[51] Int. Cl.⁵ .............................................. B65G 15/08
[52] U.S. Cl. .................... 198/825; 198/827; 198/828; 198/830
[58] Field of Search ................ 198/825, 827, 828, 830

[56] References Cited

U.S. PATENT DOCUMENTS

| | | | |
|---|---|---|---|
| 2,889,918 | 6/1959 | Bergmann | 198/825 |
| 2,971,233 | 2/1961 | Presti et al. | 198/825 |
| 3,219,174 | 11/1965 | Eckhardt et al. | 198/828 |
| 3,219,177 | 11/1965 | Reilly | 198/827 |
| 5,027,940 | 7/1991 | Woodward | 198/829 |

Primary Examiner—Cheryl L. Gastineau

[57] ABSTRACT

Catenary rigid top troughing assemblies guide and support the top, or load carrying portion of a flexible belt conveyor system. Each assembly consists of two formed cross members. Attached at each end of the cross members is a saddle, which rigidly mounts or affixes the cross members to the siderails. The saddles have slotted mounting holes to allow the assembly to be pivoted for proper belt training. Handles are attached to the saddles for lifting on or off of the siderails. One roller mounting bracket is also attached to each saddle. Two center supports span between the cross members with two roller mounting brackets affixed to each support. The rollers are mounted into the roller mounting brackets producing an inline, rigid, troughing assembly.

1 Claim, 2 Drawing Sheets

CATENARY RIGID TOP TROUGHING ASSEMBLY

This is a continuation-in-part of application Ser. No. 07/944,273 filed Sep. 14, 1992, abandoned.

BACKGROUND OF THE INVENTION

Conveyor systems have four primary components; a drive, a tail or discharge section, a flexible conveyor belt, and the conveyor belt structure.

The present invention relates to the conveyor belt structure, and more particularly, to a rigid top troughing assembly for a catenary conveyor belt structure.

Conveyor belt structures are used to guide and support conveyor belts as they convey material. Commonly, conveyor structures are mounted overhead or on the floor. Catenary structure has become a generic term representing the type of conveyor belt structure as to be described. This system is comprised of four major components; the stand(s), siderails, return roller(s), and top troughing assemblies. The stand is a weldment used to rigidly mount the return roller(s) and siderails. The return rollers rotate about their axis and support the return belt. The siderails provide a rigid mounting framework for the top troughing assemblies. The top troughing assembly is a series of three idlers which rotate about their axis, interconnected to one another. The two outer idlers are generally called wing rollers, and the center idler is appropriately referred to as the center roller. The wing rollers have a hook affixed to one end to facilitate attachment to the siderails while the other end is manufactured in such a fashion as to accept a coupling link. The coupling link connects two wing rollers with a single roller to form a top troughing assembly.

In use, the top troughing assemblies carry the conveyor belt loaded with media between the drive and the discharge point. And although the catenary top troughing assembly has provided an easily installed and relatively inexpensive design to manufacture, industry demands of higher load carrying capacities have pushed this design to the limit.

The catenary top troughing idler is seated into a bracket mounted on the siderail. While this bracket is sufficient to stop the top troughing assembly from sliding along the siderails, it does not rigidly secure the assembly to maintain the axis of the rollers perpendicular to the belt. As the loads increase, the center roller of the top troughing assembly is pushed in the direction of the belt travel, bringing the wing rollers out of perpendicularity with the belt. This top troughing assembly must also maintain a clearance between the edges of the idlers because of the inline nature. Under heavy offset loading of the belt, the clearance between one edge of the center idler and an edge of a wing roller become narrow, conversely the opposite end of the center roller and the other wing roller become wider, inherent with the hinging effect of the coupling link. This results in a reduced troughing area as well as creating a possibility for the conveyor belt to be pulled through the wider gap created between the center and wing roller. The load placed on top of these top troughing assemblies is supported by the bearing journals or shafts. Since they interconnect, the center roller shaft must carry a larger percentage of the load, thus reducing the load carrying capacity of the troughing assembly.

SUMMARY OF PRESENT INVENTION

The present invention is particularly directed toward the existing catenary systems, as well as providing a new upgrade version.

Generally, the present invention will replace standard catenary top troughing assemblies already installed in the field, allowing a higher load carrying capacity without having to modify, change out, or replace the existing siderails, stands, or return rollers. The present invention may also be installed as a new system using the industry standard siderails, 2¾" or 3" diameter tubing, as well as 2½" pipe. C-Channel, square or rectangular tubing could also be used as a suitable siderail or support.

In the present invention, two formed angle irons, or suitable structural material, referred to as the cross members, would be secured to the siderails by means of a saddle attached at each end. The cross members can be formed to any angle depending on the material to be conveyed, as this angle sets the troughing angle at which the roller will trough the belt. The saddles are formed to install readily onto the siderails. The saddles also have a slot through which a bolt can secure the assembly to the siderail, and provide adjustment to properly train the belt. Handles are installed onto the saddles to ease in loading or unloading the assembly on or off of the siderails. One roller mounting bracket is also attached to each saddle. Two center supports span between the cross members with two roller mounting brackets affixed to each support. This permits three rollers to be rigidly affixed in an inline fashion.

In use the present invention will carry the conveyor belt loaded with media between the drive and the discharge point. The present invention is seated onto the siderails and positively secured by installing a bolt through the saddle and siderail and securing with a nut. This rigidly affixes the cross members which support the rollers. The cross members are constructed of a suitable structural material. The rollers are secured by the roller mounting brackets to the cross members through the saddles and center supports. This permits the rollers to be mounted in an inline fashion while rigidly securing each roller axis so as not to be influenced by the load of the media being conveyed.

DESCRIPTION OF ILLUSTRATED EMBODIMENT

Figure 1:
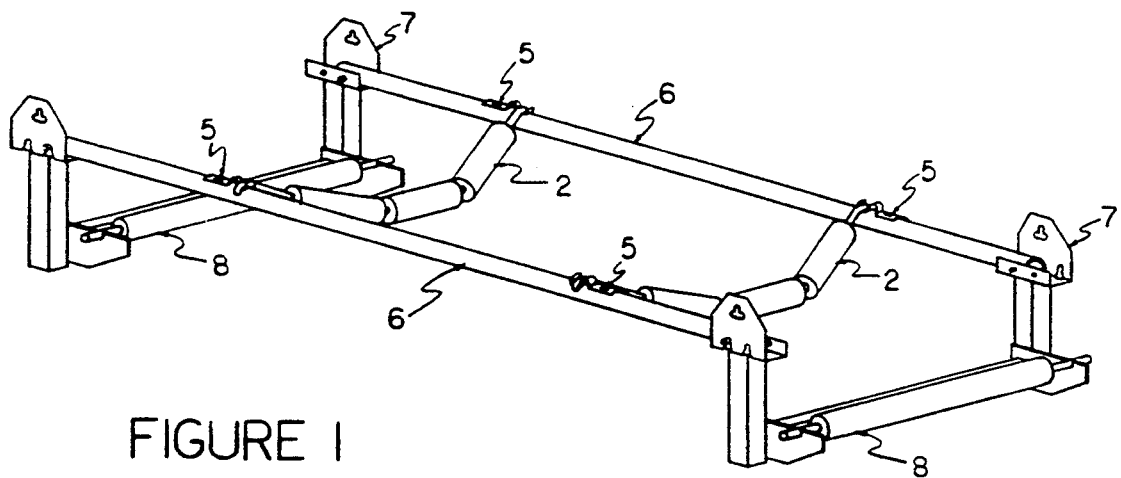
FIG. 1 Is a pictorial view of a typical prior art catenary roof mounted structure.
Figure 2:
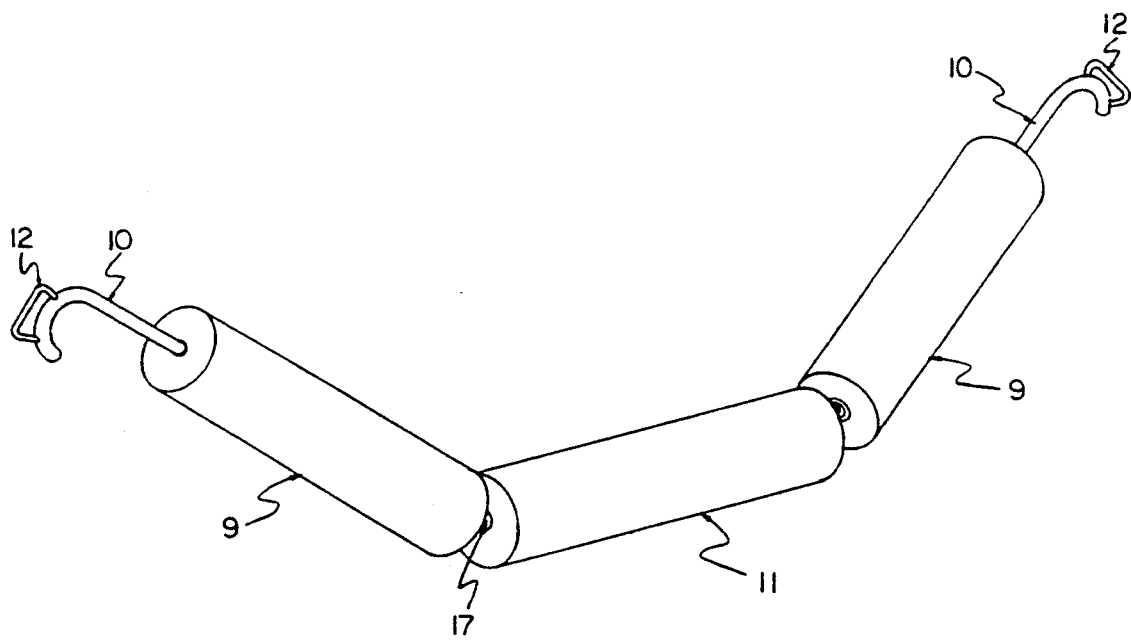
FIG. 2 Is a pictorial view of a typical prior art catenary top troughing assembly.

Referring to FIG. 1 illustrates a section of typical prior art catenary roof mounted structure. This section is generally 8'-10' long with the catenary top troughing assemblies FIG. 2 spaced between 4'-5' on center. The top troughing assemblies are seated into the siderail brackets 5 which are mounted to the siderail 6. The siderails are supported by the strands 7 which also support the return rollers 8. This section can be repeated as many times as necessary to provide the required length for a particular system. FIG. 2 shows a typical prior art catenary top troughing assembly 2. The assembly is comprised of two wing rollers 9 which have hooks 10 on one end for mounting onto the siderail brackets 5, the other ends are manufactured to accept a coupling link 17. The center roller 11 attached to the coupling links joining the wing rollers with the center rollers to form the assembly. Handles 12 have been added to this assembly to ease installation.

Figure 3:
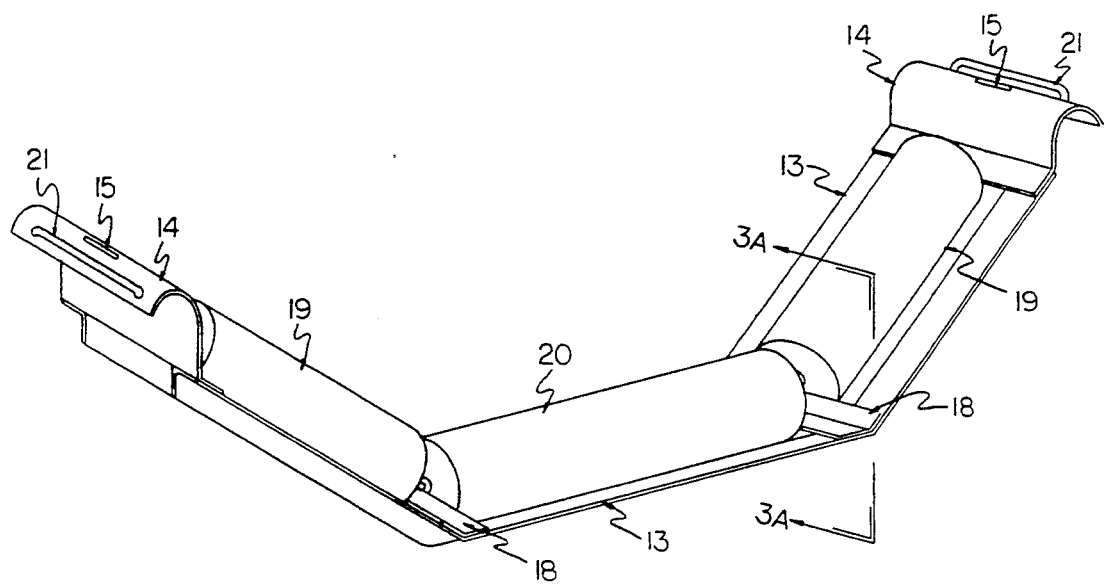
FIG. 3 Is a pictorial view of the present invention.
Figure 3A:
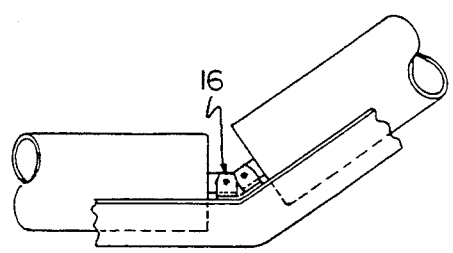
FIG. 3A is a sectional view through line A—A of FIG. 3.
Figure 4:
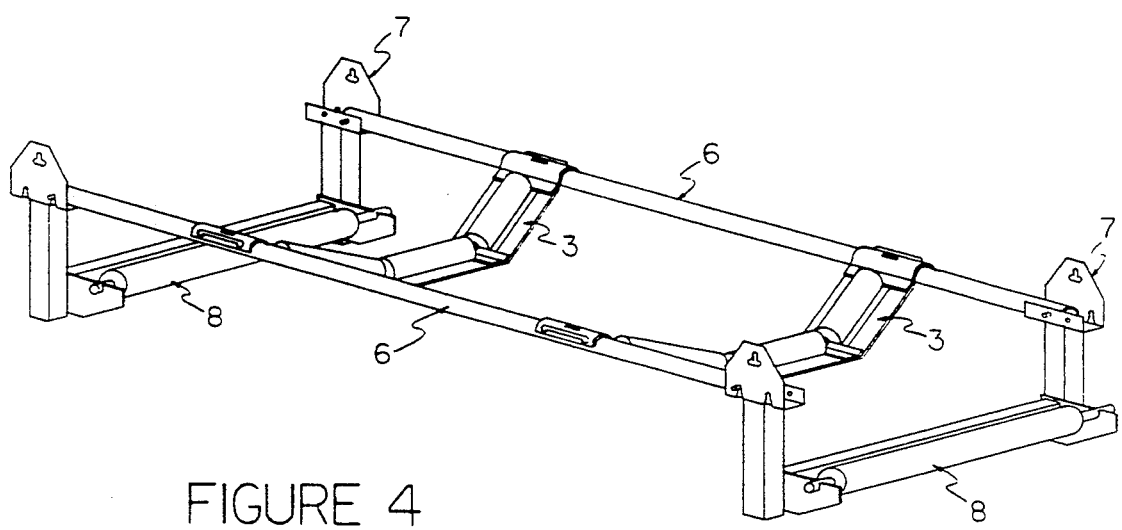
FIG. 4 Is a pictorial view of the present invention as installed on a section of catenary structure.

The present invention as illustrated in FIG. 3 replaces the catenary top troughing assembly. It will also be mounted in similar type structure. FIG. 4 shows a typical roof mounted structure with the present invention 3 installed.

In the present invention, a pair of formed angle irons, or suitable structural material, referred to as the cross members 13, would be secured to the siderails 6, by way of saddles 14 attached at each end of the cross member. The cross members can be formed to any angle depending on the material to be conveyed, as this angle sets the troughing angle at which the rollers will trough the belt. The saddles can be securely attached to the siderails by installing a bolt through a slot 15 in the saddle and through the siderail and securing with a nut. The slot provides an adjustment to "train" the belt. Handles 21 are installed onto the saddles to ease in loading or unloading the assembly on or off of the siderails. One roller mounting bracket 16 is also attached to each saddle. Two center supports 18 span between the cross members with two roller mounting brackets 16 attached to each support. This permits three rollers 19, 20 to be rigidly affixed in an inline fashion.

I claim:

1. A conveyor apparatus comprising of a frame structure means for moving a flexible conveyor belt across said structure means, a plurality of belt supporting catenary rigid top troughing assemblies longitudinally spaced along the length of the belt engaging and supporting said belt to a generally trough shaped support, with each of said catenary rigid top troughing assemblies consisting of a pair of formed cross members, which defines the shape of the trough, a pair of saddles attached at either end to provide a means to affix said cross members securely to an existing support of siderails; said saddles are provided with slotted holes to provide training, handles to aid in the ease of installation, and an attach point for a roller mounting bracket; two center supports span between said cross members with two roller mounting brackets attached to each support, positioning three rollers onto a desired inline troughing shape.

* * * * *